(12) United States Patent
Morinaga et al.

(10) Patent No.: US 12,298,383 B2
(45) Date of Patent: May 13, 2025

(54) TRACKING APPARATUS, TRACKING METHOD, AND NON-TRANSITORY STORAGE MEDIUM STORING TRACKING PROGRAM

(71) Applicant: DENSO CORPORATION, Kariya (JP)

(72) Inventors: Mitsutoshi Morinaga, Kariya (JP); Koichiro Suzuki, Tokyo (JP); Chiharu Yamano, Tokyo (JP); Norikazu Ikoma, Tokyo (JP)

(73) Assignee: DENSO CORPORATION, Kariya (JP)

( * ) Notice: Subject to any disclaimer, the term of this patent is extended or adjusted under 35 U.S.C. 154(b) by 402 days.

(21) Appl. No.: 17/659,307

(22) Filed: Apr. 14, 2022

(65) Prior Publication Data

US 2022/0236401 A1 Jul. 28, 2022

Related U.S. Application Data

(63) Continuation of application No. PCT/JP2020/039269, filed on Oct. 19, 2020.

(30) Foreign Application Priority Data

Oct. 18, 2019 (JP) .................................. 2019-190909

(51) Int. Cl.
G01S 13/72 (2006.01)
G01S 13/42 (2006.01)
G01S 17/58 (2006.01)

(52) U.S. Cl.
CPC .............. *G01S 13/72* (2013.01); *G01S 13/42* (2013.01); *G01S 17/58* (2013.01)

(58) Field of Classification Search
CPC combination set(s) only.
See application file for complete search history.

(56) References Cited

U.S. PATENT DOCUMENTS 10,276,047 B2 * 4/2019 Seo ...................... G06V 20/586

FOREIGN PATENT DOCUMENTS

| JP | 2007-078409 A | | 3/2007 | |
| JP | 2009015671 A | * | 1/2009 | |
| JP | 2012103819 A | * | 5/2012 | |
| WO | WO-2018212294 A1 | * | 11/2018 | ............. G01C 21/28 |

OTHER PUBLICATIONS

Granstrom et al., "Extended Object Tracking: Introduction, Overview, and Applications," Journal of Advances in Information Fusion, vol. 12, No. 2, Dec. 2017, 37 pgs.

* cited by examiner

*Primary Examiner* — Vladimir Magloire
*Assistant Examiner* — Eric K Hodac
(74) *Attorney, Agent, or Firm* — Maschoff Brennan

(57) ABSTRACT

A tracking apparatus which tracks a target includes a predilection unit, correction unit, and updating unit. The prediction unit predicts the state distribution of the target at a specific time. The correction unit, for at least one observation point of the target, that is observed at the specific time, uses a likelihood function to define a degree of certainty of the state distribution predicted by the prediction unit, and corrects the likelihood function depending on the number of observation points. The updating unit updates the state distribution at the specific time based on the likelihood function corrected by the correction unit.

18 Claims, 6 Drawing Sheets

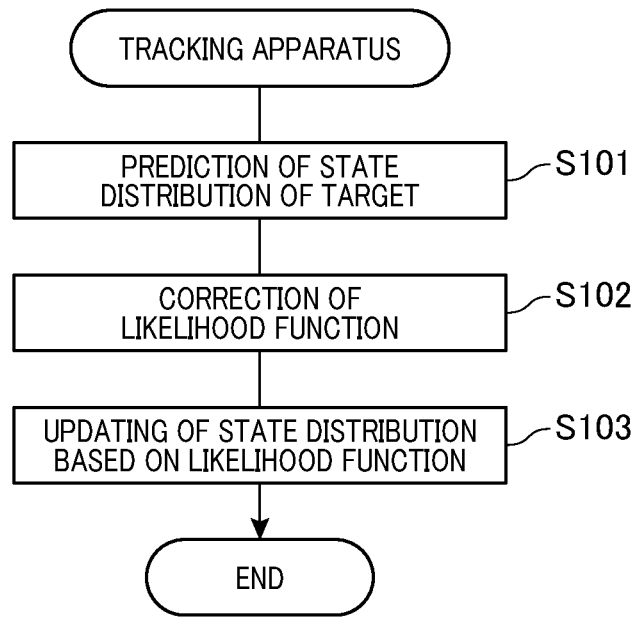

TRACKING APPARATUS, TRACKING METHOD, AND NON-TRANSITORY STORAGE MEDIUM STORING TRACKING PROGRAM

CROSS-REFERENCE TO RELATED APPLICATION

The present application is a continuation application of International Application No. PCT/JP2020/039269, filed on Oct. 19, 2020, which claims priority to Japanese Patent Application No. 2019-190909, filed in Japan on Oct. 18, 2019. The contents of these applications are incorporated herein by reference in their entirety.

BACKGROUND

1. Technical Field

The present disclosure relates to tracking technology for tracking a target.

2. Related Art

EOT (Extended Object Tracking), which consists of detecting a wide target and performing processing for tracking the target by using a plurality of observation points of the target that are observed, is known.

SUMMARY

The present disclosure provides a tracking apparatus. As an aspect of the present disclosure, a tracking apparatus for tracking a target includes at least a prediction section, a correction section, and an updating section. The prediction section predicts the state distribution of the target at a specific time. The correction section, for at least one observation point of the target, that is observed at the specific time, uses a likelihood function to define a degree of certainty of the state distribution predicted by the prediction section, and corrects the likelihood function depending on the number of observation points. The updating section updates the state distribution for the specific time based on the likelihood function corrected by the correction section.

BRIEF DESCRIPTION OF THE DRAWINGS

In the accompanying drawings:

FIG. 8 is a flowchart showing a tracking method according to the embodiment; and FIG. 9 is a table for use in explaining the action and effects of the embodiment.

DETAILED DESCRIPTION OF THE PREFERRED EMBODIMENTS

Figure 1:
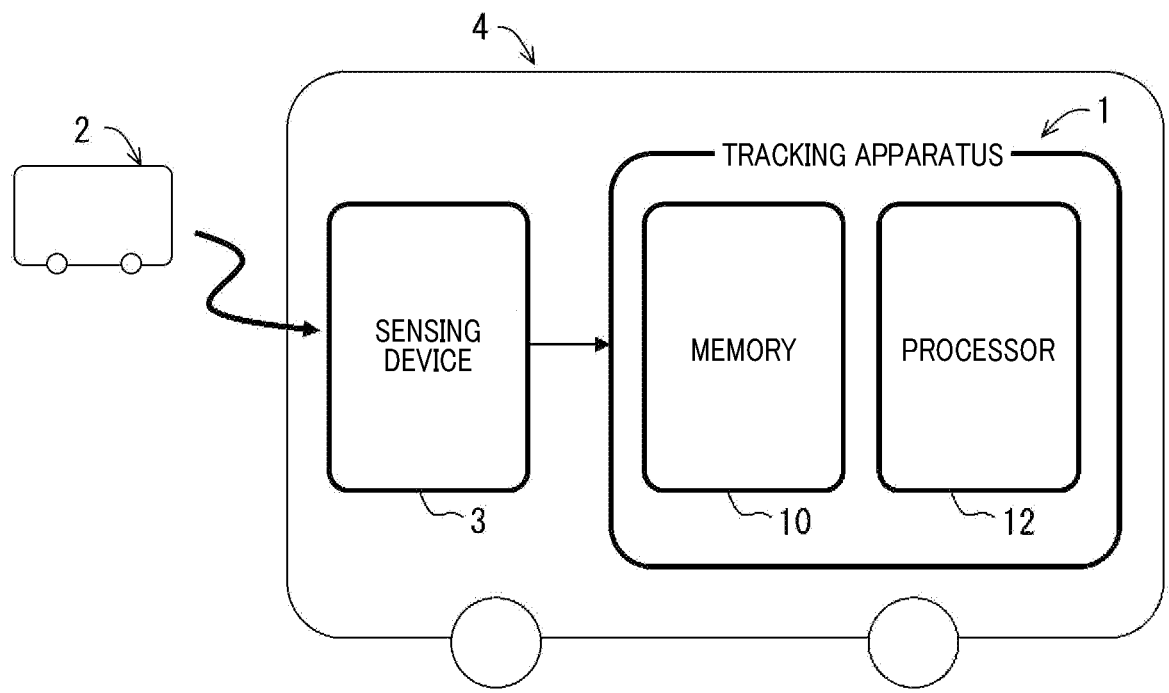
FIG. 1 is a block diagram showing the overall structure of an embodiment of a tracking apparatus.

EOT is described for example in Non-Patent Literature below.

[Non-Patent Literature]: K. Granstrom, M. Baum, and S. Reuter, "Extended object tracking: Introduction, overview and applications," Journal of Advances in Information Fusion, vol. 12, no. 2, 2017.

However, in EOT, the number of observation points changes with the passage of time, which affects the prediction of the target state. Hence, the availability and accuracy of target tracking depends on the number of observation points. In particular, when the number of observation points is small, there is an increased possibility of loss of target tracking, due to the prediction being based on only a small amount of observation data. Hence, improvements in tracking technology are desirable.

An aspect of the present disclosure is directed to provide a technology for suppressing target tracking loss. Another aspect of the present disclosure is directed to provide a tracking method for suppressing target tracking loss. Yet another aspect of the present disclosure is directed to provide a tracking program for suppressing target tracking loss.

One or more technical means of the present disclosure are described in the following. The reference numerals in parentheses specified in the text indicate correspondences with specific means of an embodiment, described in detail hereinafter, and do not limit the technical scope of the present disclosure.

A first aspect of the present disclosure is a tracking apparatus that tracks a target. The tracking apparatus is provided with at least a prediction section, a correction section, and an updating section. The prediction section predicts the state distribution of the target at a specific time. The correction section, for at least one observation point of the target, that is observed at the specific time, uses a likelihood function to define a degree of certainty of the state distribution predicted by the prediction section, and corrects the likelihood function depending on the number of observation points. The updating section updates the state distribution for the specific time, based on the likelihood function corrected by the correction section.

A second aspect of the disclosure is a tracking method of tracking the target, which is executed by a processor. The tracking method includes at least a prediction process, a correction process, and an updating process. The prediction process predicts the state distribution of the target at a specific time. The correction process, for at least one observation point of the target, that is observed at a specific time, uses a likelihood function to define a degree of certainty of the predicted state distribution, and corrects the likelihood function depending on the number of the observation points. The updating process updates the state distribution for the specific time, based on the corrected likelihood function.

A third aspect of the disclosure is a non-transitory storage medium which stores a tracking program for tracking a target. The tracking program includes instructions configured to cause a processor. The instructions configure the processor to perform processes of a prediction process, a correction process, and an updating process. The prediction process predicts the state distribution of the target at a specific time. The correction process, for at least one observation point of the target, that is observed at the specific time, uses a likelihood function to define a degree of certainty of the predicted state distribution, and corrects the likelihood function depending on the number of observation points. The updating process updates the state distribution for the specific time, based on the corrected likelihood function.

According to the first to third aspects, a degree of certainty of the predicted state distribution at a specific time is defined by a likelihood function for at least one observation point of the target, observed at the specific time. It is thereby made possible to accurately update the state distribution of the target at the specific time and suppress loss of target tracking, based on correcting the likelihood function according to the number of observation points.

An embodiment of the invention is described in the following based on the drawings.

As shown in FIG. 1, the tracking apparatus 1 according to the embodiment executes EOT that recognizes a wide target 2 from at least one observation point of the target 2, and performs target-following control processing to the recognized target. The tracking apparatus 1 is mounted on a vehicle 4 together with a sensing device 3. The sensing device 3 is, for example, a millimeter-wave radar or LIDAR (Light Detection and Ranging/Laser Imaging Detection and Ranging) apparatus that can observe a reflection point cloud obtained from sensing the target 2. The sensing device 3 repeats the sensing of the target 2 and the observation of the reflection point cloud at set time intervals. Hence with the tracking apparatus 1, a reflection point cloud observed by the sensing device 3 at a specific time k is recognized as at least one observation point of the target 2 at the specific time k.

The tracking apparatus 1 is connected to the sensing device 3 via at least one of a LAN (Local Area Network), a wire harness, an internal bus, and the like. The tracking apparatus 1 consists of a dedicated computer, which includes at least one memory 10 and one processor 12. The memory 10 is a non-transitory tangible storage medium that is at least one of a semiconductor memory, magnetic media, optical media, and the like, and which non-transitory stores a computer-readable program, data, and the like. The processor 12 includes, as its core, at least one type of CPU (Central Processing Unit), GPU (Graphics Processing Unit), RISC (Reduced Instruction Set Computer)—CPU, and the like.

Figure 2:
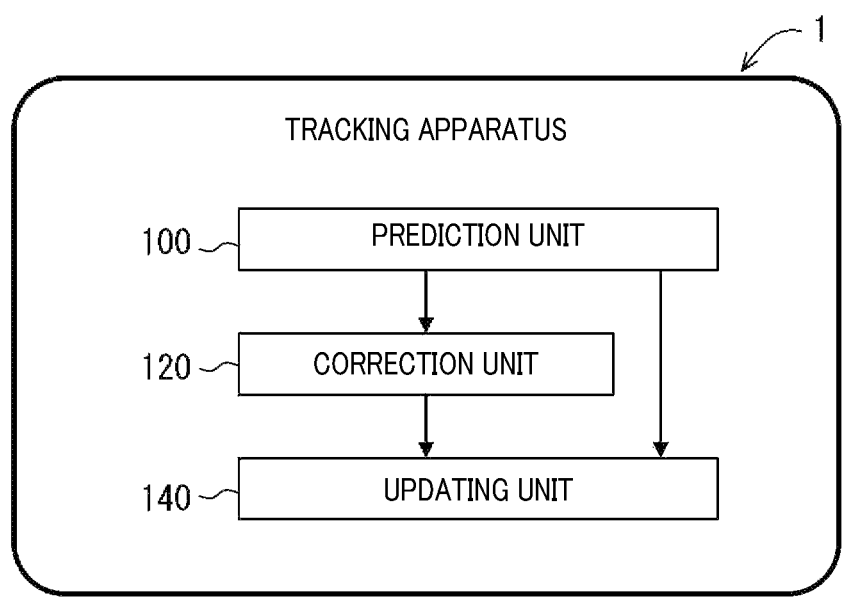
FIG. 2 is a block diagram showing a detailed configuration of a tracking apparatus according to the embodiment.

The processor 12 executes a plurality of instructions for a prediction process, a correction process, and an updating process, which are included in a tracking program that is stored in the memory 10. The prediction process predicts the state distribution of a target at a specific time. In the correction process, the degree of certainty of the predicted state distribution is defined by a likelihood function for at least one observation point of the target, observed at the specific time, and the likelihood function is corrected in accordance with the number of observation points. The updating process updates the state distribution of the target for the specific time, based on the corrected likelihood function. The tracking apparatus 1 thus configures a plurality of functional units for tracking the target 2. By configuring a plurality of functional units in this way, the tracking apparatus 1 can suppress target tracking loss, through causing the processor to execute a plurality of instructions included in the tracking program that has been stored in the memory 10 for tracking the target 2. As shown in FIG. 2, the plurality of functional units configured by the tracking apparatus 1 include a prediction unit 100, a correction unit 120, and an updating unit 140.

Figure 3:
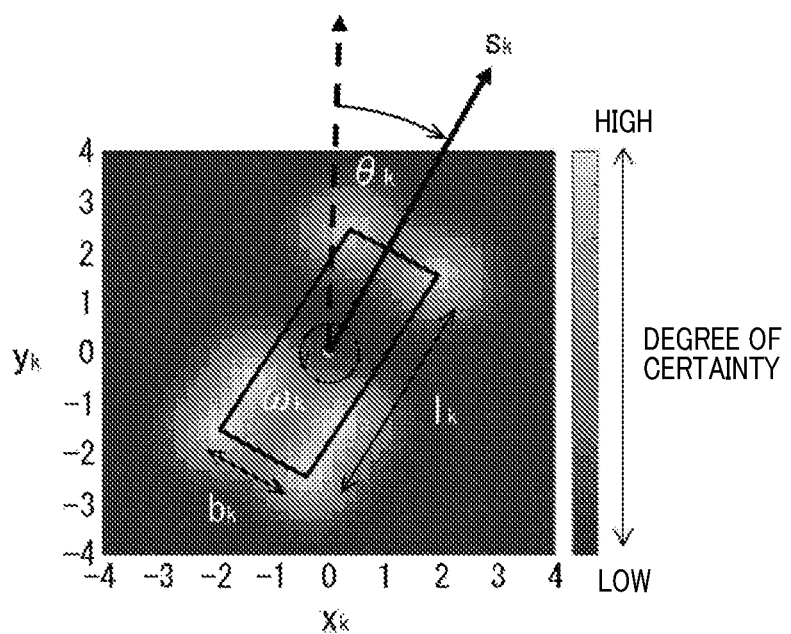
FIG. 3 is a characteristic diagram for use in explaining a prediction unit according to the embodiment.

The prediction unit 100 shown in FIG. 2 predicts the state of the target 2 at a specific time k. Assuming as a premise of this prediction that the target 2 is another vehicle which is in the surroundings of the vehicle 4 (see FIG. 1), the state space $X_k$ of the target 2 predicted at the specific time k is defined by the following equation 1, as shown by the observation probability distribution of a rectangular vehicle model such as is the target 2 in FIG. 3. In equation 1, $x_k$ and $y_k$ are horizontal and vertical positions in Cartesian coordinates respectively, while $\theta_k$, $s_k$, and $\omega_k$ are the direction, velocity, and yaw rate of the target 2 respectively, and 1, $l_k$ and $b_k$ are the length and width of the target 2.

[Equation 1]
$$X_k = (x_k, y_k, \theta_k, s_k, \omega_k, l_k, b_k)^T \quad (1)$$

On the other hand, designating an index that identifies respective independent observation points of the target 2 at a specific time k as m, the index m is defined by the following equation 2, using a total number M of observation points. Then designating the observation states of the target 2 at the respective observation points at the specific time k as $z_k^m$, the state space $Z_k$ of the target 2 observed at the specific time k is expressed by the following equation 3.

[Equation 2]
$$m = 1 \sim M \quad (2)$$

[Equation 3]
$$Z_k = \{z_k^1, \cdots, z_k^M\} \quad (3)$$

The prediction unit 100 predicts the state distribution F $(X_k|Z_k)$ of the target 2 at a specific time k, on the premise of equations 1 to 3, by using a first particle filter. Specifically, designating i as the index for identifying sampling points in the Monte Carlo method, the index i is defined by the following equation 4 using the number of particles I, that is, using the total number of sampling points. The state distribution F $(X_k|Z_k)$ of the target 2 at the specific time k is then predicted by the following equation 5. In equation 5, $W_k^i$ is a weighting function which makes the sum of the sampling points from i=1 to I take the value 1. In equation 5, $\delta$ $(X_k - X_k^i)$ is a delta function, using the state space $X_k$ of the target 2 at the specific time k and the state space $X_k^i$ at each sampling point of the target 2 at the specific time k. In the processing effected by the prediction unit 100, the $W_{k-1}^i$ calculated by the updating unit 140 at a previous time k−1, prior to the specific time k, is substituted for $W_k^i$ in equation 5.

[Equation 4]

$$i = 1 \sim I \quad (4)$$

[Equation 5]

$$F(X_k \mid Z_k) = \sum_{i=1}^{I} \{W_k^i \cdot \delta(X_k - X_k^i)\} \quad (5)$$

In the processing effected by the correction unit 120 shown in FIG. 2, a judgement is made as to the degree of certainty of the state distribution F $(X_k|Z_k)$ at the specific time k, as predicted by the processing of the prediction unit 100 for at least one observation point observed by the sensing device 3 at the specific time k. Hence in the processing effected by the correction unit 120, the observation state $z_k^m$ of each observation point, with respect to the state space $X_k$ included in the predicted state distribution F $(X_k|Z_k)$, is associated with at least one of various types of association processes.

In the processing effected by the correction unit 120, after being associated by this association processing, the degree of certainty of the state distribution F $(X_k|Z_k)$ at each observation point is defined by means of an individual likelihood function p $(z_k^m|X_k)$, using the mixed Gaussian model. Specifically, designating the index that identifies a probability density function in the mixed Gaussian model as j, the index j is defined by the following equation 6, using the total number J of probability density functions. The reliability of the prediction of the state space $X_k$ included in the state distribution F $(X_k|Z_k)$ at the specific time k, with respect to the observation state $z_k^m$ of each observation point at the specific time k, is then expressed by the individual likelihood function p $(z_k^m|X_k)$, from the following equation 7. In equation 7, $w_j(X_k)$ is a weighting function which depends on the state space $X_k$ included in the state distribution F $(X_k|Z_k)$, and for which the sum of $w_j(X_k)$ from j=1 to J takes the value 1. In equation 7, $\phi(z_k^m|\mu_j, R)$ is a probability density function of the observation state $z_k^m$ in a Gaussian distribution, having the average j and the covariance R as parameters.

[Equation 6]

$$j = 1 \sim J \quad (6)$$

[Equation 7]

$$p(z_k^m \mid X_k) = \sum_{j=1}^{J} \{w_j(X_k) \cdot \phi(z_k^m \mid \mu_j, R)\} \quad (7)$$

Figure 4:
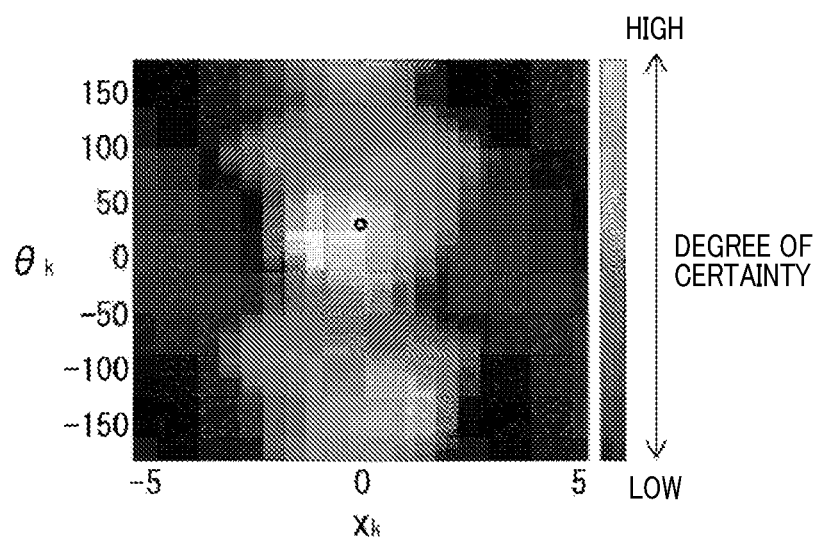
FIG. 4 is a characteristic diagram for use in explaining a correction unit according to the embodiment.
Figure 5A:
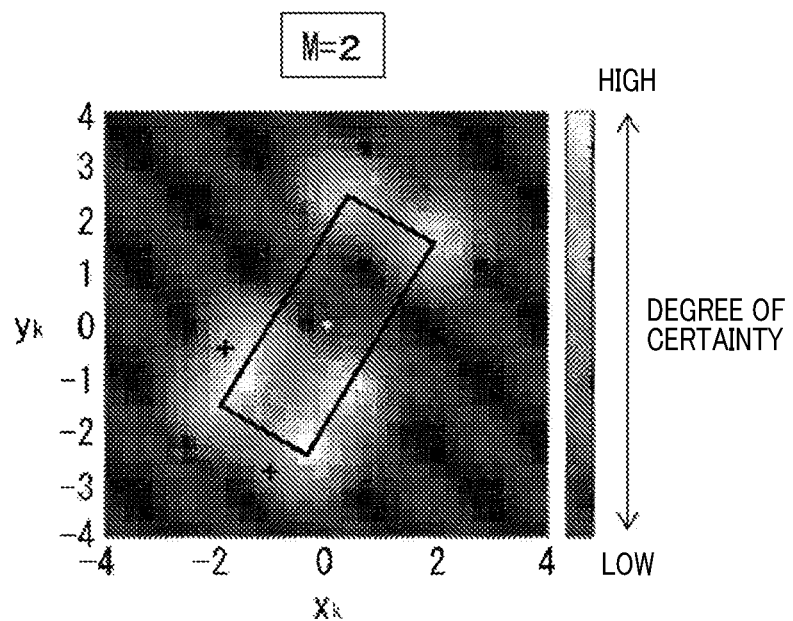
FIG. 5A is a characteristic diagram for use in explaining a correction unit according to the embodiment.
Figure 5B:
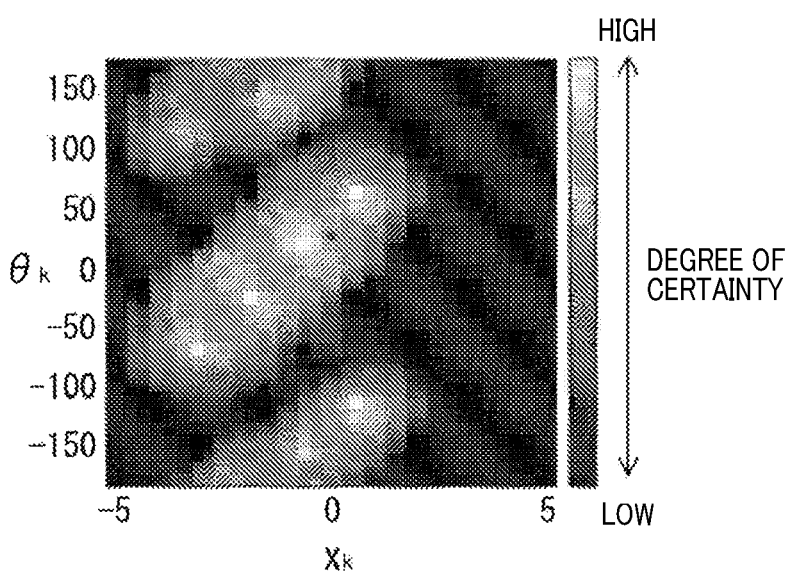
FIG. 5B is a characteristic diagram for use in explaining a correction unit according to the embodiment.
Figure 6A:
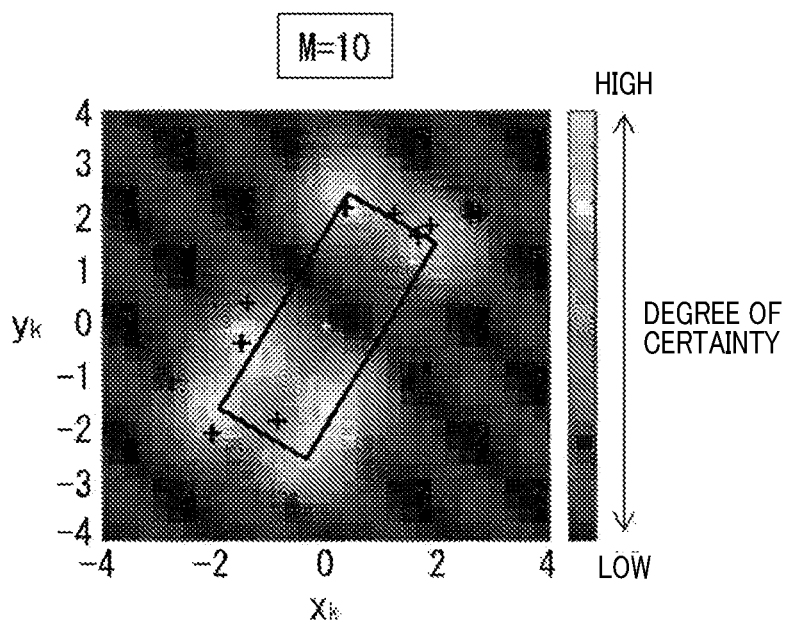
FIG. 6A is a characteristic diagram for use in explaining a correction unit according to the embodiment.
Figure 6B:
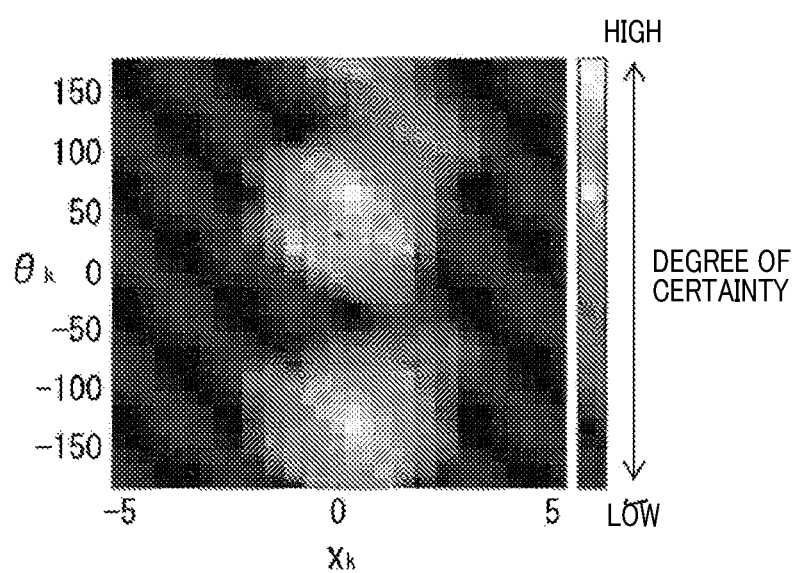
FIG. 6B is a characteristic diagram for use in explaining a correction unit according to the embodiment.

FIG. 4 shows, as the state distribution F $(X_k|Z_k)$ predicted at a specific time k, an ideal distribution in which the number of observation points M is infinite. On the other hand, FIG. 5A is a characteristic diagram in which two observation points are superimposed on the observation probability distribution of the rectangular vehicle model, and FIG. 6A is a characteristic diagram in which 10 observation points are superimposed on the observation probability distribution of the rectangular vehicle model. FIG. 5B shows the state distribution F $(X_k|Z_k)$ of the rectangular vehicle model, predicted at a specific time k, when there are two observation points. FIG. 6B is a state distribution F $(X_k|Z_k)$ of the rectangular vehicle model predicted at a specific time k when there are 10 observation points. FIGS. 5B and 6B show that the state distribution F $(X_k|Z_k)$ can be expected to deteriorate from the ideal distribution shown in FIG. 4. Furthermore, as is clear from FIGS. 4 to 6B, as the number of observation points M decreases, the extent of deterioration of the predicted state distribution F $(X_k|Z_k)$ with respect to the ideal distribution may increase.

Therefore, in the processing of the correction unit 120, the individual likelihood function p $(z_k^m|X_k)$ of each observation point at the specific time k is corrected according to the number of observation points M. Specifically, in the processing of the correction unit 120, substitution correction is applied to the value of the covariance R, which is one of the parameters of the Gaussian distribution that follows the individual likelihood function p $(z_k^m|X_k)$ in the above equation 7. The substitution correction is performed with the following equation 8, using a correction function η (M) in accordance with the number of observation points M. The correction function η (M) is preset, for example through simulation or by experiment, such as to output a value that increases the covariance R as the number of observation points M decreases. The following equation 9 shows an example in which the output of the correction function η (M) when the target 2 is the other vehicle (see FIG. 1) is divided into cases according to the number of observation points M. Since the output of the correction function η (M) is divided into cases according to the number of observation points M as in equation 9, in the present embodiment, the value of the covariance R that is corrected through substitution by the following equation 8 is similarly divided into cases according to the number of observation points M. By using such a correction function η (M), in the processing of the correction unit 120, an individual likelihood function p $(z_k^m|X_k)$ is calculated in which the covariance R of the Gaussian distribution is corrected according to the number of observation points M.

[Equation 8]

$$R = \eta(M) \cdot R \quad (8)$$

[Equation 9]

$$\eta(M) = \begin{cases} \dfrac{10}{M} & [\text{if } 1 < M \leq 3] \\ 2.5 & [\text{if } 3 < M \leq 5] \\ 1 & [\text{if } M > 5] \end{cases} \quad (9)$$

Furthermore, in the processing of the correction unit 120, the overall likelihood function L $(Z_k|X_k)$ is further defined by using the individual likelihood function p $(z_k^m|X_k)$ of each corrected observation point. The degree of certainty of the state distribution F $(X_k|Z_k)$ for all the observation points observed at the specific time k is then defined by the overall likelihood function L $(Z_k|X_k)$. Specifically, in the processing of the correction unit 120, the prediction reliability representing the degree of certainty of the state distribution F ($X_k|Z_k$) with respect to all the observation points observed at the specific time k, is calculated by using the overall likelihood function L ($Z_k|X_k$) of the following equation 10. As a result, the overall likelihood function L ($Z_k|X_k$), which includes the individual likelihood function p ($z_k^m|X_k$) of each observation point, also becomes a function that is corrected based on the number of observation points M.

[Equation 10]

$$L(Z_k | X_k) = \exp\left\{\frac{1}{M}\sum_{m=1}^{M} \log p(z_k^m | X_k)\right\} \quad (10)$$

In the processing of the updating unit 140 shown in FIG. 2, the state distribution F ($X_k|Z_k$) is updated at the specific time k predicted by the processing of the prediction unit 100, based on the overall likelihood function L ($Z_k|X_k$) that has been corrected by the processing of the correction unit 120. Specifically, in the processing by the updating unit 140, the state distribution F ($X_k|Z_k$) is updated at the predicted specific time k by using a second particle filter of arithmetic processing, which differs in part from the first particle filter that is used in the processing of the prediction unit 100.

Specifically, in the processing of the updating unit 140, the overall likelihood function L ($X_k|Z_k^i$) calculated by the above equation 10 is replaced by overall likelihood functions L ($X_k|Z_k^i$) for each of the sampling points. Furthermore, in the processing by the updating unit 140, an updated state distribution F ($X_k|Z_k$) is calculated by using the above equation 11 to reflect the replaced function L ($X_k|Z_k^i$) in the above equation 5. In the processing by the updating unit 140 at this time, a weighting function $W_{k-1}^i$ that had been calculated by the processing of the updating unit 140 at the previous time k−1 is inserted as $W_{k-1}^i$ in equation 11.

[Equation 11]

$$W_k^i = \frac{L(Z_k | X_k^i) \cdot W_{k-1}^i}{\sum_{i=1}^{I} \{L(Z_k | X_k^i) \cdot W_{k-1}^i\}} \quad (11)$$

Figure 7A:
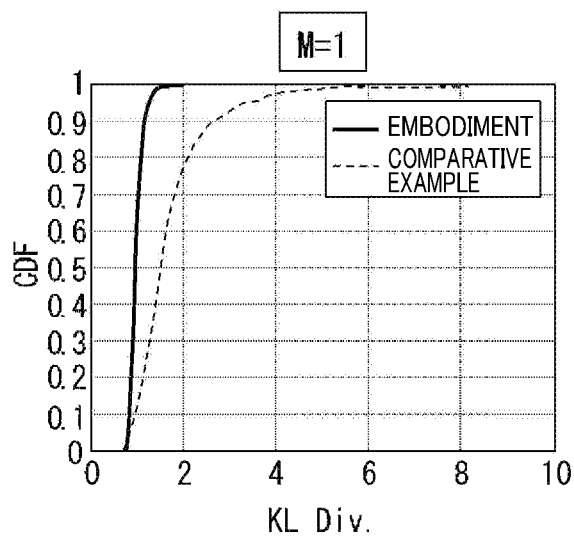
FIG. 7A is a characteristic diagram for use in explaining an updating unit according to the embodiment.
Figure 7B:
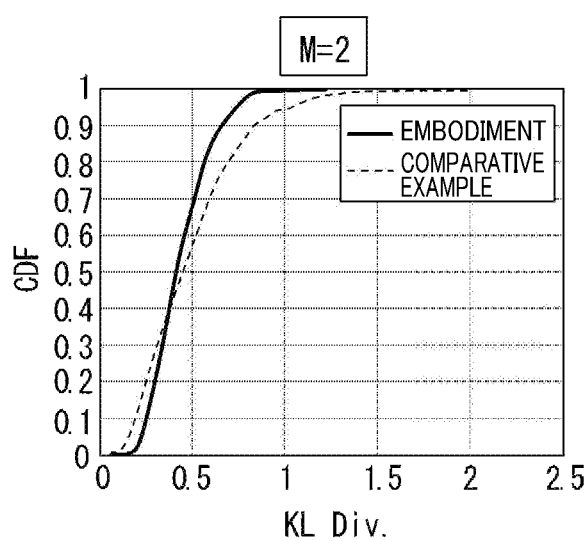
FIG. 7B is a characteristic diagram for use in explaining an updating unit according to the embodiment.
Figure 7C:
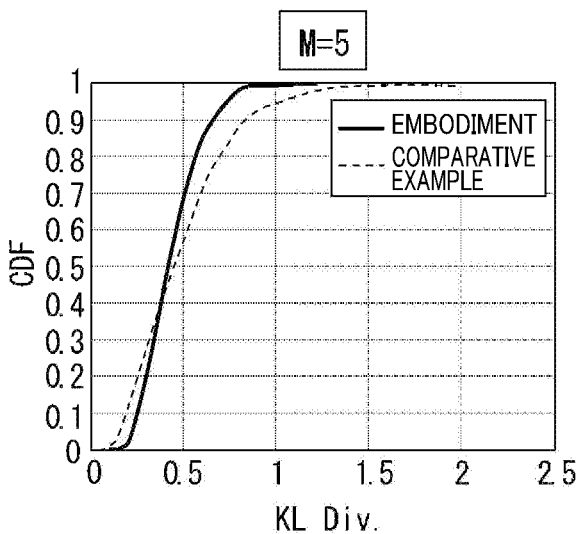
FIG. 7C is a characteristic diagram for use in explaining an updating unit according to the embodiment.

FIGS. 7A, 7B, and 7C show results obtained for the present embodiment with the number of observation points M equal to 1, 2, and 5, respectively, corrected using the above equations 8 and 9, and comparative results which were obtained without applying correction using the equations 8 and 9 FIGS. 7A, 7B, and 7C provide comparisons of degrees of deterioration of the state distribution F ($X_k|Z_k$) after being updated at a specific time k. In FIGS. 7A, 7B, and 7C, for the same vertical axis value, the smaller the horizontal axis value representing the degree of deterioration of the state distribution F ($X_k|Z_k$), the more accurate the prediction. With the present embodiment as opposed to the comparative example, as is clear from FIGS. 7A, 7B, and 7C, even if the number of observation points M decreases, accurate prediction can be achieved by updating the state distribution F ($X_k|Z_k$) for all observation points and correcting the overall likelihood function L ($Z_k|X_k$) in accordance with the number of observation points M.

From the above, with respect to the present embodiment, the prediction unit 100 corresponds to the "prediction section", the correction unit 120 corresponds to the "correction section", and the updating unit 140 corresponds to the "updating section".

The flow of a tracking method whereby the tracking apparatus 1 tracks the target 2 by cooperation between the functional units 100, 120, and 140 will be described in the following with reference to FIG. 8. This flow is started during a tracking period from a previous time k−1 to a specific time k. In this flow, "S" signifies a step in which an instruction included in the tracking program stored in the memory 10 is executed.

In the processing of S101, the state distribution F ($X_k|Z_k$) of the target 2 at the specific time k is predicted through processing executed by the prediction unit 100 prior to the specific time k. Specifically, the state distribution F ($X_k|Z_k$) is predicted by using, as a first particle filter, a weighting function $W_{k-1}^i$ that satisfies the state distribution F ($X_{k-1}|Z_{k-1}$), where the state distribution F ($X_{k-1}|Z_{k-1}$), was obtained for the previous time k−1, and updated by the preceding flow iteration of the processing of S103.

In the processing of S102, the state distribution F ($X_k|Z_k$) predicted by the processing of S101 of the current flow iteration, respective individual likelihood functions p ($z_k^m|X_k$) for each observation point observed at the specific time k, and also an overall likelihood function L ($Z_k|X_k$) for all of the observation points observed at the specific time k, are corrected through processing by the correction unit 120. In particular, each individual likelihood function p ($z_k^m|X_k$) is corrected in accordance with the number of observation points M by increasing a covariance R, where the covariance R is a parameter of the Gaussian distribution that the individual likelihood function p ($z_k^m|X_k$) follows as the number of observation points M at the specific time k decreases. The overall likelihood function L ($Z_k|X_k$) is then corrected by using the individual likelihood function p ($z_k^m|X_k$) of each corrected observation point.

In the processing of S103, the state distribution F ($X_k|Z_k$) at the specific time k predicted by the processing of S101 is updated by the processing of the updating unit 140, based on the overall likelihood function L ($Z_k|X_k$) that has been corrected by the processing of S102. Specifically, the state distribution F ($X_k|Z_k$) is updated by using, in the second particle filter, the weighting function $W_{k-1}^i$ that satisfies the state distribution F ($X_{k-1}|Z_{k-1}$) that was obtained for the previous time k−1, and which was updated by the processing of S103 in the preceding flow iteration.

From the above, in the present embodiment, the processing of S101 corresponds to the "prediction process", the processing of S102 corresponds to the "correction process", and the processing of S103 corresponds to the "updating process".

Action and Effects

The effects of the above embodiment are described in the following.

According to the present embodiment, when at least one observation point of a target 2 is observed at a specific time k, the degree of certainty of the predicted state distribution F ($X_k|Z_k$) at the specific time k is defined by the overall likelihood function L ($Z_k|X_k$). By updating the state distribution F ($X_k|Z_k$) of the target 2 at the specific time k based on the overall likelihood function L ($Z_k|X_k$), after correcting the overall likelihood function L ($Z_k|X_k$) in accordance with the number of observation points M, the tracking loss can be suppressed, as shown in FIG. 9. Note that FIG. 9 shows, in the case of the present embodiment, the numbers of occurrences of tracking loss that occur for the state distribution F $(X_k|Z_k)$ of the target 2 at the specific time k when correction is applied by using the above equations 8 and 9, and shows, in the case of a comparative example, the numbers of occurrences of tracking loss that occur when the correction is not applied.

Furthermore, since correction in accordance with the number of observation points M is applied to the covariance R of the Gaussian distribution, which follows the overall likelihood function L $(Z_k|X_k)$, the influence of the number of observation points M on the state distribution F $(X_k|Z_k)$ can be reduced. As a result, it is possible to improve the accuracy of updating the state distribution F $(X_k|Z_k)$ and more effectively suppress tracking loss.

In particular, in the example used with the present embodiment, whereby the correction function applied to the covariance R of the Gaussian distribution is classified according to the number of observation points M, the calculation processing for correcting the covariance R becomes relatively simple. It is thereby made possible to suppress the tracking loss while reducing the calculation load of suppressing the tracking loss.

Moreover, with the present embodiment, in which the covariance R of the Gaussian distribution is increased as the number of observation points M decreases, the accuracy of updating the state distribution F $(X_k|Z_k)$ can be improved by being based on an overall likelihood function L $(Z_k|X_k)$ that is appropriately corrected, even if the number of observation points M is small. This further increases the effectiveness of suppressing the tracking loss.

Furthermore, with the present embodiment, after being predicted by using a first particle filter, the state distribution F $(X_k|Z_k)$ is then updated by means of the corrected overall likelihood function L $(Z_k|X_k)$, using a second particle filter whose arithmetic processing is different from that of the first particle filter. The reliability, from prediction to updating the state distribution F $(X_k|Z_k)$, can thereby be improved, and increased suppression of the tracking loss can be achieved.

The present embodiment, with its capability for suppressing tracking loss, can be valuable for application to an apparatus 1 having a millimeter-wave radar or LIDAR apparatus for detecting a target 2, mounted as a sensing device 3 on a vehicle 4 such as on an autonomous driving vehicle or an advanced driving support vehicle, and can be especially effective for detecting the surroundings of the vehicle in such cases.

OTHER EMBODIMENTS

Although an embodiment has been described above, the present disclosure is not to be considered as limited to the above embodiment, and could be applied to various embodiments without departing from the gist of the present disclosure.

Modified examples of a tracking apparatus, tracking method and tracking program may be utilized, and may be employed other than in vehicle-mounted applications. In such cases, and in particular those other than vehicle-mounted applications, it is not necessary for the tracking apparatus and the sensing device 3 to be mounted on the same object.

A tracking apparatus according to a modified example may be a dedicated computer that is configured to include at least one digital circuit or analog circuit as a processor. Such digital circuits include, for example, at least one of an ASIC (Application Specific Integrated Circuit), FPGA (Field Programmable Gate Array), SOC (System on a Chip), PGA (Programmable Gate Array), CPLD (Complex Programmable Logic Device), etc. Furthermore, such a digital circuit may include a memory which stores a program.

In a modified example, the covariance R of the Gaussian distribution which is included in the overall likelihood function L $(Z_k|X_k)$, with the individual likelihood function p $(z_k^m|X_k)$ of each observation point substituted, may be corrected by the function η (M). This is because the following equation 12 can be obtained by rearranging equations 7 and 10 in the above-described embodiment.

[Equation 12]

$$L(Z_k \mid X_k) = \exp\left[\frac{1}{M}\sum_{m=1}^{M}\log\left\{\sum_{j=1}^{J}w_j(X_k)\cdot\phi(z_k^m \mid \mu_j, R)\right\}\right] \quad (12)$$

In a modified example, the processing of S102 by the correction unit 120 and the processing of S103 by the updating unit 140 may be executed in the same step by the same unit. This is because the following equation 13 can be obtained by rearranging equations 10 and 11 in the above-described embodiment.

[Equation 13]

$$W_k^i = \frac{\exp\left\{\frac{1}{M}\sum_{m=1}^{M}\log p(z_k^m \mid X_k^i)\right\}\cdot W_{k-1}^i}{\sum_{i=1}^{I}\left[\exp\left\{\frac{1}{M}\sum_{m=1}^{M}\log p(z_k^m \mid X_k^i)\right\}\cdot W_{k-1}^i\right]} \quad (13)$$

With a modified example, after predicting the state distribution F $(X_k|Z_k)$ by using an estimation filter other than the first particle filter, the state distribution F $(X_k|Z_k)$ may be updated by using an estimation filter which is other than the second particle filter, and which uses arithmetic processing different from that employed when the prediction is performed with the corrected overall likelihood function L $(Z_k|X_k)$.

What is claimed is:
1. A tracking apparatus which tracks a target, comprising:
at least one processor; and
at least one memory communicatively coupled to the at least one processor and having a set of computer-executable instructions stored thereon that cause the at least one processor to implement operations comprising:
predicting a state distribution of the target at a specific time;
correcting individual likelihood functions in accordance with a number of observation points of the target, the individual likelihood functions respectively defining a degree of certainty of the state distribution predicted for each observation point of the target observed at the specific time;
calculating an overall likelihood function by using each corrected individual likelihood function of each observation point to correct the overall likelihood function in accordance with the number of observation points, the overall likelihood function defining the degree of certainty of the state distribution predicted for all observation points of the target at the specific time; and updating the state distribution at the specific time based on the overall likelihood function.

2. The tracking apparatus according to claim 1, wherein the correcting of the individual likelihood functions includes correcting the respective covariances of the respective Gaussian distributions that the individual likelihood functions follow by using a correction function in accordance with the number of the observation points such that the respective covariances of the respective Gaussian distributions are corrected according to the number of observation points.

3. The tracking apparatus according to claim 2, wherein the correction function classifies the respective covariances according to the number of the observation points.

4. The tracking apparatus according to claim 2, wherein the correction function is set to increase the respective covariances in accordance with a decrease in the number of the observation points.

5. The tracking apparatus according to claim 1, wherein:
the state distribution is predicted by using a first particle filter; and
the state distribution is updated based on the overall likelihood function using a second particle filter whose arithmetic processing is different from that of the first particle filter.

6. The tracking apparatus according to claim 1, wherein:
the tracking apparatus is mounted on a vehicle together with a sensing device that observes the target; and
the sensing device is a millimeter-wave radar or LIDAR apparatus.

7. A tracking method of tracking a target, executed by a processor, comprising:
predicting a state distribution of the target at a specific time;
correcting individual likelihood functions in accordance with a number of observation points of the target, the individual likelihood functions respectively defining a degree of certainty of the state distribution predicted for each observation point of the target observed at the specific time;
calculating an overall likelihood function by using each corrected individual likelihood function of each observation point to correct the overall likelihood function in accordance with the number of observation points, the overall likelihood function defining the degree of certainty of the state distribution predicted for all observation points of the target at the specific time; and
updating the state distribution at the specific time based on the corrected overall likelihood function.

8. The tracking method according to claim 7, wherein the correcting of the individual likelihood functions includes correcting includes correcting the respective covariances of the respective Gaussian distributions that the individual likelihood functions follow by using a correction function in accordance with the number of the observation points such that the respective covariances of the respective Gaussian distributions are corrected according to the number of observation points.

9. The tracking method according to claim 8, wherein the correction function classifies the respective covariances according to the number of the observation points.

10. The tracking method according to claim 8, wherein the correction function is set to increase the respective covariances in accordance with a decrease in the number of the observation points.

11. The tracking method according to claim 7, wherein:
the predicting includes predicting the state distribution by using a first particle filter; and
the updating includes, based on the overall likelihood function, updating the state distribution using a second particle filter whose arithmetic processing is different from that of the first particle filter used in the predicting.

12. The tracking method according to claim 7, wherein:
the tracking method is for tracking the target when observed by a sensing device that is mounted on a vehicle; and
the sensing device is a millimeter-wave radar or LIDAR apparatus.

13. A non-transitory storage medium storing a tracking program for tracking a target, the tracking program comprising instructions configured to cause a processor, the instructions configure the processor to perform processes of:
a prediction process that predicts a state distribution of the target at a specific time;
a correction process that corrects individual likelihood functions in accordance with a number of observation points of the target, the individual likelihood functions respectively defining a degree of certainty of the state distribution predicted for each observation point of the target observed at the specific time;
at the specific time, uses a likelihood function to define a degree of certainty of the predicted state distribution, and which corrects the likelihood function based on the number of observation points;
a calculating process that calculates an overall likelihood function by using each corrected individual likelihood function of each observation point to correct the overall likelihood function in accordance with the number of observation points, the overall likelihood function defining the degree of certainty of the state distribution predicted for all observation points of the target at the specific time; and
an updating process that updates the state distribution at the specific time based on the overall likelihood function.

14. The non-transitory storage medium according to claim 13, wherein
the instructions include that the correction process corrects the respective covariances of the respective Gaussian distributions that the individual likelihood functions follow by using a correction function in accordance with the number of the observation points such that the respective covariances of the respective Gaussian distributions are corrected according to the number of observation points.

15. The non-transitory storage medium according to claim 14, wherein
the correction function classifies the respective covariances according to the number of the observation points.

16. The non-transitory storage medium according to claim 14, wherein
the correction function is set to increase the respective covariances in accordance with a decrease in the number of the observation points.

17. The non-transitory storage medium according to claim 13, wherein
the instructions include that:
the prediction process predicts the state distribution by using a first particle filter; and
the updating process, based on the overall likelihood function, updates the state distribution using a second particle filter whose arithmetic processing is different from that of the first particle filter used in the prediction process.

18. The non-transitory storage medium according to claim 13, wherein
the tracking program is for tracking the target when observed by a sensing device that is mounted on a vehicle, and
the sensing device is a millimeter-wave radar or LIDAR apparatus.

* * * * *